United States Patent
Liu et al.

(10) Patent No.: US 10,364,794 B2
(45) Date of Patent: Jul. 30, 2019

(54) WHEEL-HUB DRIVEN WIND TURBINES

(71) Applicant: Yueli Electric (Jiangsu) Co., Ltd., China, Kunshan (CN)

(72) Inventors: Hangxian Liu, Jiangsu (CN); Yu Gong, Jiading (CN)

(73) Assignee: Yueli Electric (Jiangsu) Co., Ltd., Kunshan (CN)

( * ) Notice: Subject to any disclaimer, the term of this patent is extended or adjusted under 35 U.S.C. 154(b) by 0 days.

(21) Appl. No.: 15/121,845

(22) PCT Filed: Oct. 30, 2015

(86) PCT No.: PCT/CN2015/093373
§ 371 (c)(1),
(2) Date: Aug. 26, 2016

(87) PCT Pub. No.: WO2017/070938
PCT Pub. Date: May 4, 2017

(65) Prior Publication Data
US 2018/0223802 A1    Aug. 9, 2018

(51) Int. Cl.
*F03D 9/00* (2016.01)
*H02P 9/04* (2006.01)
(Continued)

(52) U.S. Cl.
CPC ............ *F03D 5/04* (2013.01); *F03D 9/20* (2016.05); *F03D 9/25* (2016.05); *F03D 9/32* (2016.05);
(Continued)

(58) Field of Classification Search
CPC ..... F03D 5/04; F03D 9/20; F03D 9/25; F03D 9/32; F03D 15/00; H02K 7/183; H02K 7/1846
See application file for complete search history.

(56) References Cited

U.S. PATENT DOCUMENTS

| | | | | |
|---|---|---|---|---|
| 665,810 A | * | 1/1901 | Stretch | F03D 5/04 290/55 |
| 1,635,598 A | * | 7/1927 | Whitehorn | H02P 9/00 180/65.245 |

(Continued)

FOREIGN PATENT DOCUMENTS

| | | |
|---|---|---|
| CN | 101012811 A | 8/2007 |
| CN | 101050752 A | 10/2007 |

(Continued)

OTHER PUBLICATIONS

PCT International Search Report and Written Opinion dated Jul. 6, 2016, issued in corresponding International Application No. PCT/CN2015/093373 (11 pages).

(Continued)

*Primary Examiner* — Tulsidas C Patel
*Assistant Examiner* — Thomas K Quigley
(74) *Attorney, Agent, or Firm* — Finnegan, Henderson, Farabow, Garrett & Dunner LLP

(57) ABSTRACT

A wheel-hub driven wind turbine apparatus is disclosed. One embodiment of the apparatus may include a body and at least one vertical-axis wind turbine blade mounted on the body to translate wind forces exerting on the at least one vertical-axis wind turbine blade to the body, causing the body to move. The apparatus may also include at least one wheel-hub attached to the body and configured to rotate when driven by the movement of the body. The apparatus may also include at least one generator coupled to the at least one wheel-hub to generate electrical power when driven by the rotation of the at least one wheel-hub.

19 Claims, 12 Drawing Sheets

(51) Int. Cl.
*F03D 5/04* (2006.01)
*F03D 15/00* (2016.01)
*F03D 9/20* (2016.01)
*F03D 9/32* (2016.01)
*F03D 9/25* (2016.01)
*H02K 7/18* (2006.01)

(52) U.S. Cl.
CPC .............. *F03D 15/00* (2016.05); *H02K 7/183* (2013.01); *H02K 7/1846* (2013.01); *F05B 2240/941* (2013.01); *Y02E 10/70* (2013.01); *Y02E 10/725* (2013.01); *Y02E 10/728* (2013.01)

(56) References Cited

U.S. PATENT DOCUMENTS

| | | | | | |
|---|---|---|---|---|---|
| 1,917,655 | A * | 7/1933 | Leash | .................. | F03D 3/068 416/118 |
| 2,082,966 | A * | 6/1937 | Madaras | .................. | F03D 3/007 416/4 |
| 3,895,236 | A * | 7/1975 | Herron | .................. | F03G 7/00 290/44 |
| 4,168,439 | A * | 9/1979 | Palma | .................. | F03D 3/06 290/44 |
| 4,351,405 | A * | 9/1982 | Fields | .................. | B60K 1/00 180/65.225 |
| 4,371,346 | A * | 2/1983 | Vidal | .................. | B63H 7/00 114/102.29 |
| 4,527,950 | A * | 7/1985 | Biscomb | .................. | F03D 3/067 416/117 |
| 4,589,344 | A * | 5/1986 | Davison | .................. | F03D 5/04 104/118 |
| 4,756,666 | A * | 7/1988 | Labrador | .................. | F03D 5/04 415/5 |
| 4,832,569 | A * | 5/1989 | Samuelsen | .................. | F03D 3/068 290/55 |
| 5,758,911 | A * | 6/1998 | Gerhardt | .................. | F03D 5/02 104/24 |
| 7,075,191 | B2 * | 7/2006 | Davison | .................. | F03B 17/066 290/43 |
| 7,157,805 | B2 * | 1/2007 | Mooring | .................. | F03D 5/04 290/55 |
| 7,550,865 | B2 * | 6/2009 | Jonsson | .................. | F03D 3/068 290/42 |
| 7,902,684 | B2 * | 3/2011 | Davison | .................. | F03B 17/064 290/44 |
| 8,120,190 | B2 * | 2/2012 | Bravo | .................. | H02J 17/00 290/1 R |
| 8,164,213 | B2 * | 4/2012 | Mahaffy | .................. | F03D 3/005 290/55 |
| 8,217,526 | B2 * | 7/2012 | Devitt | .................. | C23C 4/04 290/55 |
| 8,257,018 | B2 * | 9/2012 | Coffey | .................. | F03D 3/005 290/44 |
| 9,051,916 | B2 * | 6/2015 | King | .................. | F03D 3/005 |
| 9,562,518 | B2 * | 2/2017 | Patel | .................. | F03D 7/06 |
| 2004/0164562 | A1 * | 8/2004 | Latyshev | .................. | F03D 5/04 290/55 |
| 2006/0032687 | A1 * | 2/2006 | Park | .................. | A45C 5/14 180/65.1 |
| 2008/0122227 | A1 * | 5/2008 | Hammerle | .................. | B60R 25/00 290/1 R |
| 2010/0270810 | A1 * | 10/2010 | Liebermann | .................. | B60L 7/06 290/1 A |
| 2011/0080004 | A1 * | 4/2011 | Hadi | .................. | F03D 5/04 290/55 |
| 2011/0278079 | A1 * | 11/2011 | Stoicoviciu | .................. | B60L 5/005 180/2.1 |
| 2012/0049524 | A1 * | 3/2012 | Nikolic | .................. | H02K 7/1846 290/50 |
| 2012/0274076 | A1 * | 11/2012 | Kelaiditis | .................. | F03D 3/062 290/55 |
| 2014/0132155 | A1 * | 5/2014 | Strothnnann | .................. | B62J 6/08 315/77 |
| 2015/0145260 | A1 * | 5/2015 | Huang | .................. | H02K 21/02 290/1 R |

FOREIGN PATENT DOCUMENTS

| | | |
|---|---|---|
| CN | 101588116 | 11/2009 |
| CN | 201763530 U | 3/2011 |
| CN | 102011707 A | 4/2011 |
| CN | 201972857 U | 9/2011 |
| CN | 102486161 A | 6/2012 |
| CN | 102686875 A | 9/2012 |
| CN | 102748228 A | 10/2012 |
| CN | 103850883 A | 6/2014 |
| CN | 101050752 A | 10/2017 |
| DE | 4234649 A | 7/1993 |
| DE | 4234649 A1 | 7/1993 |
| JP | 2004019444 A | 1/2004 |
| JP | 2004019444 A | 1/2004 |
| WO | WO 2006131575 A1 | 12/2006 |
| WO | WO2006131575 A1 | 12/2016 |

OTHER PUBLICATIONS

International Preliminary Report on Patentability dated May 1, 2018, issued in corresponding International Application No. PCT/CN2015/093373 (5 pages).

* cited by examiner

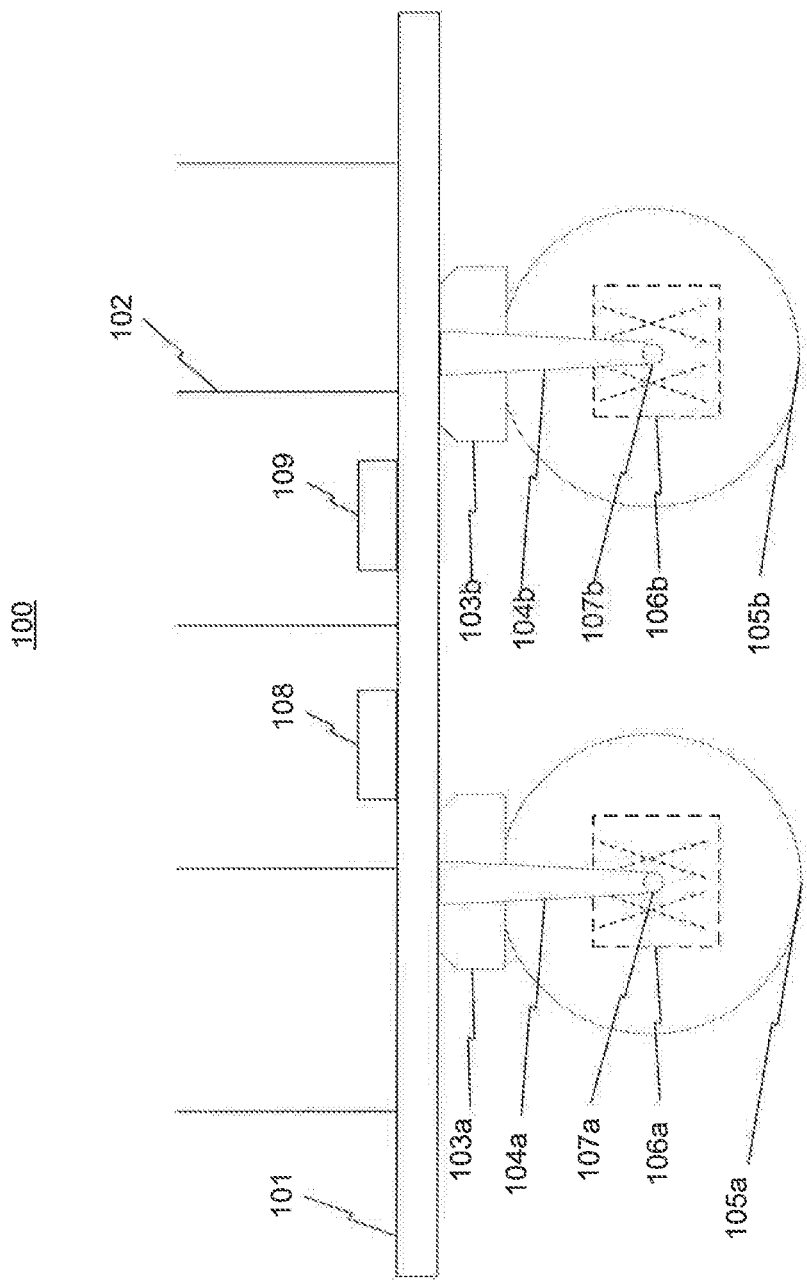

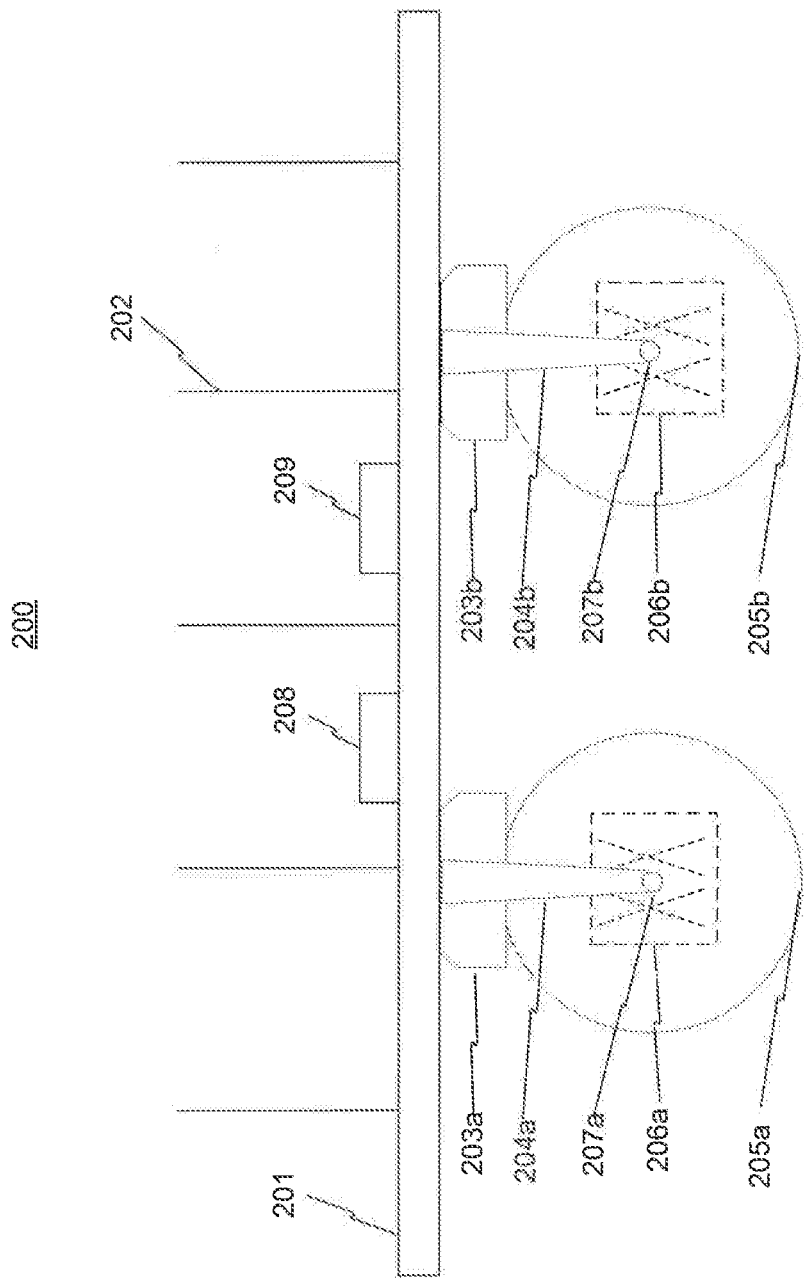

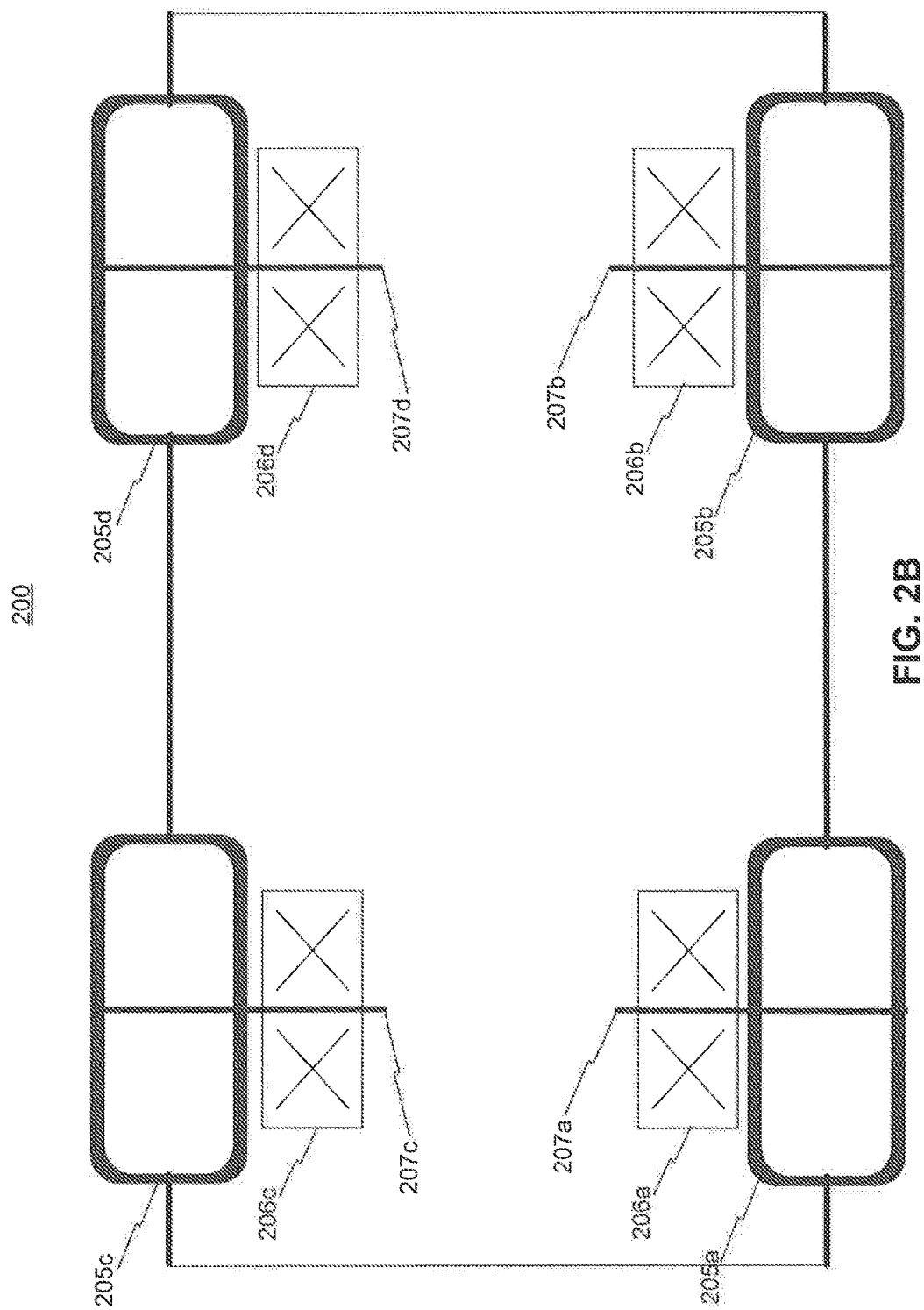

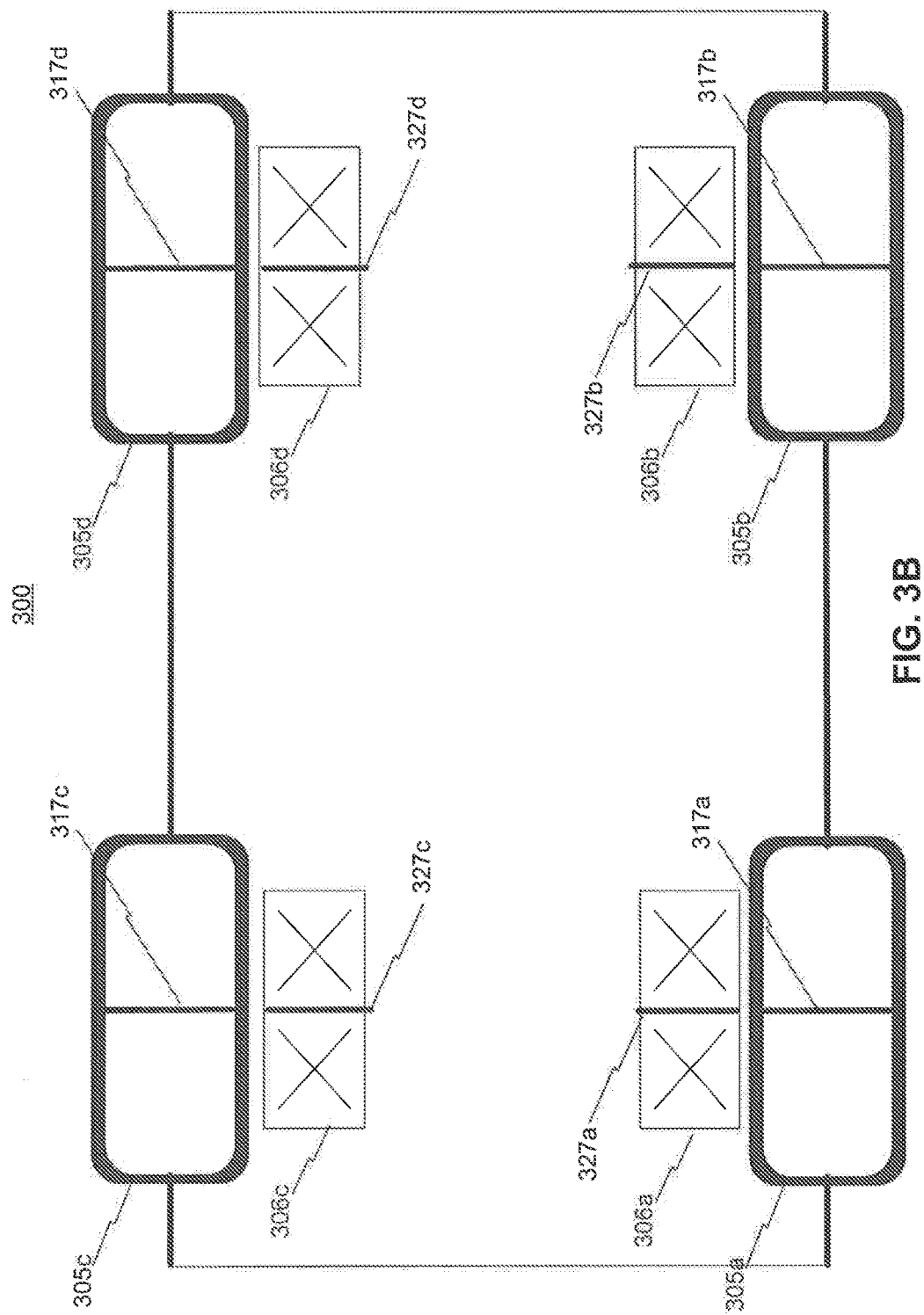

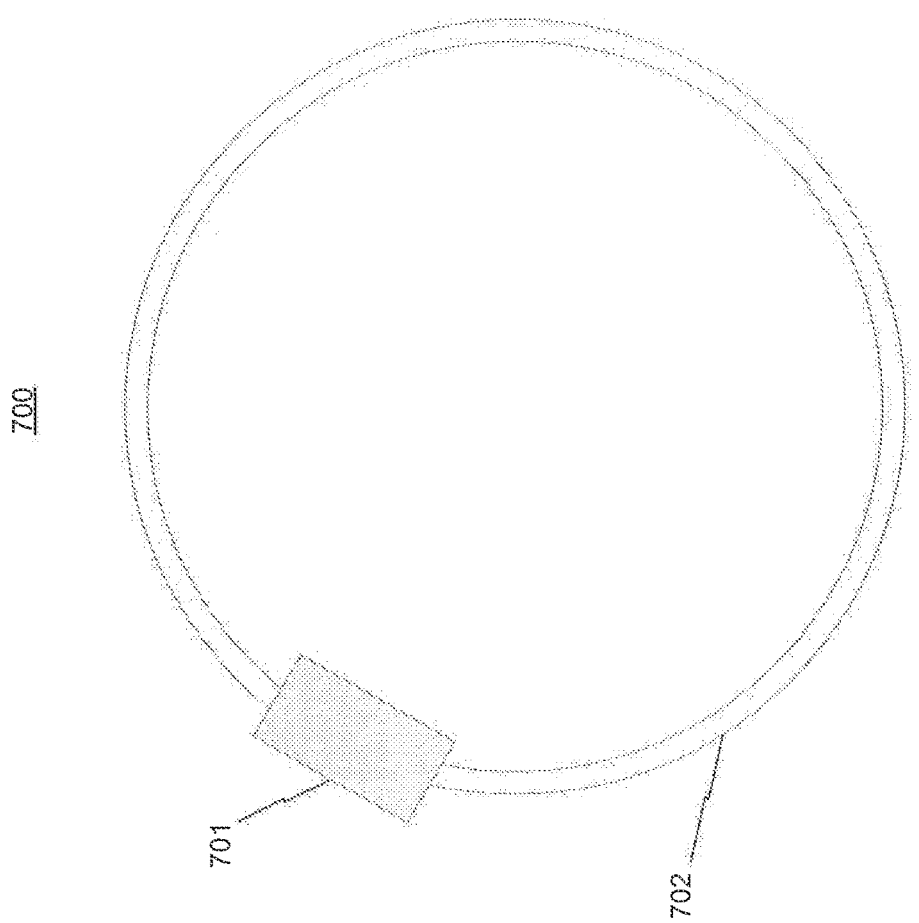

WHEEL-HUB DRIVEN WIND TURBINES

DESCRIPTION OF THE INVENTIONS

Field

The present application relates to the field of wind power generators and, more particularly, to wheel-hub driven wind turbines in which electrical power generators are coupled to wheel-hubs driven by vertical-axis wind turbine blades and utilize a linear velocity at a circumference of a movement route of a large-size vertical-axis wind-power-driven device with wheels to generate electrical power.

Background

Wind power generators can be categorized by turbine axis configuration or by size. A horizontal-axis wind turbine includes a main rotor shaft positioned in a horizontal direction at the top of a tower, and is pointed into or out of the wind. A vertical-axis wind turbine includes a main rotor shaft positioned traverse, and not necessarily vertical, to the wind. In general, large-size wind power generators are more advantageous than small-size wind power generators in terms of unit cost of power generation, land use efficiency, power generation efficiency, operation cost, and maintenance cost.

The current maximum power capacity of horizontal-axis wind power generators is 5~6 MW. Further increases in power capacity will require wind turbine blades to have a larger diameter and thus a larger linear velocity (i.e., speed) at the blade tips. For example, for a 2.5-MW wind power generator, the wind turbine blades have a diameter of about 100 meters and a linear velocity of 200 km/h at the blade tips, reaching a speed comparable to a high-speed train. The size of the blades, however, is limited by inertial forces, gravitational forces, and mechanical fatigue associated with alternating loads. Moreover, larger blades require taller towers, thus making installation and maintenance more complicated and expensive. Therefore, further increasing the power capacity of horizontal-axis wind power generators is very difficult.

In comparison, vertical-axis wind power generators (VWPGs) can overcome the disadvantages of horizontal-axis wind power generators. First, VWPGs do not require tall towers, and thus equipment installation can be done at the ground level. Second, VWPGs can have more blades installed, and can still work even when the blades rotate at a slow speed. Third, VWPGs are omni-directional, do not need to track the wind, and thus do not require a complex mechanism to yaw the rotor or pitch the blades.

In conventional VWPGs, however, the generators are directly driven by the vertical central shafts at the center of the turbines, and thus the rotational velocity at the center driving the generators is much lower than a linear velocity at a circumference of the turbines. Since VWPGs usually rotate at a slower speed and a higher torque than horizontal-axial wind power generators, they suffer from poor power-generation performance and thus increase the cost of power generation. For example, conventional VWPGs installed on a water-floating platform, conventional VWPGs installed on a magnetic rail, and conventional VWPGs installed on a super-huge-rail utilize a linear velocity at the center, not at a circumference, of the turbines to drive the generators, and thus suffer from poor power-generation efficiencies. In addition, those conventional VWPGs have other deficiencies, such as high manufacturing cost, high technical difficulties, etc.

SUMMARY

In one aspect, the present disclosure is directed to a wheel-hub driven wind turbine apparatus. The apparatus may include a body and at least one vertical-axis wind turbine blade mounted on the body and configured to translate wind forces exerting on the at least one vertical-axis wind turbine blade to the body, causing the body to move. The apparatus may also include at least one wheel-hub attached to the body and configured to rotate when driven by the movement of the body. The apparatus may also include at least one generator coupled to the at least one wheel-hub and configured to generate electrical power when driven by the rotation of the at least one wheel-hub.

Additional objects and advantages of the present disclosure will be set forth in part in the following detailed description, and in part will be inferred from the description, or may be learned by practice of the present disclosure. The objects and advantages of the present disclosure will be realized and attained by means of the elements and combinations particularly pointed out in the appended claims.

It is to be understood that the foregoing general description and the following detailed description are exemplary and explanatory only, and are not restrictive of the invention, as claimed.

BRIEF DESCRIPTION THE DRAWINGS

The accompanying drawings, which constitute a part of this specification, illustrate several embodiments and, together with the description, explain the disclosed wheel-hub driven wind turbines.

FIG. 1A is a schematic side view of an embodiment of an exemplary wheel-hub driven wind turbine consistent with the present disclosure.

FIG. 2A is a schematic side view of another embodiment of an exemplary wheel-hub driven wind turbine consistent with the present disclosure.

FIG. 2B is a schematic top view of an embodiment of the exemplary wheel-hub driven wind turbine of FIG. 2A.

FIG. 3B is a schematic top view of an embodiment of the exemplary wheel-hub driven wind turbine of FIG. 3A.

FIG. 7 is a schematic top view of another embodiment of an exemplary wheel-hub driven wind turbine consistent with the present disclosure.

DESCRIPTION OF THE EMBODIMENTS

Reference will now be made in detail to the exemplary embodiments illustrated in the accompanying drawings. Wherever possible, the same reference numbers will be used throughout the drawings to refer to the same or like parts. Number-letter combinations, such as 100a and 100b, represent similar components that may have similar structures or functions described below.

Figure 1B:
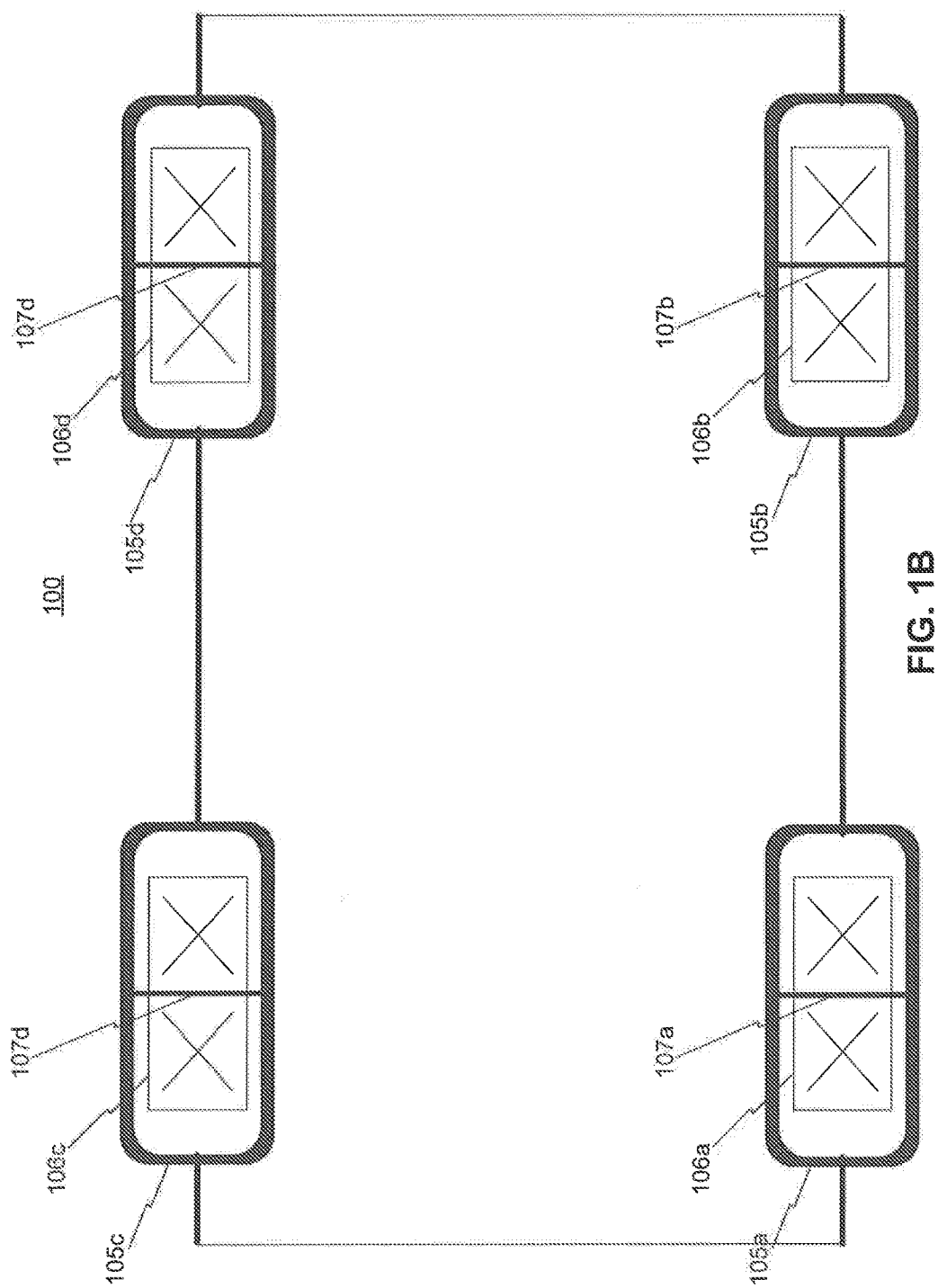
FIG. 1B is a schematic top view of an embodiment of the exemplary wheel-hub driven wind turbine of FIG. 1A.

FIG. 1A is a schematic side view of an embodiment of an exemplary wheel-hub driven wind turbine 100, in which a generator is disposed inside a wheel-hub and an outer rotor of the generator may be formed integrally with the wheel-hub, consistent with the present disclosure. FIG. 1B is a schematic top view of an embodiment of the exemplary wheel-hub driven wind turbine 100 of FIG. 1A. Some components of apparatus 100 may be shown in only one of FIGS. 1A and 1B to keep the illustrations clean. For example, component 102 is shown in FIG. 1A but not in FIG. 1B. Some similar components may not be shown in FIG. 1A due to the angle of view. For example, from a top view in FIG. 1B, four similar components 106a-106d (or 105a-105d or 107a-107d) are shown, but from a side view in FIG. 1A, only 106a and 106b (or 105a and 105b, or 107a and 107b) can be seen. Apparatus 100 may comprise a number of components, some of which may be optional.

Apparatus 100 may comprise a body 101, at least one vertical-axis wind turbine blade 102 mounted on the body 101, at least one brake unit, e.g. 103a (or 103b, 103c, or 103d), at least one connecting unit, e.g. 104a (or 104b, 104c, or 104d), attached to the body 101, at least one wheel-hub, e.g. 105a (or 105b, 105c, or 105d), with a central shaft, e.g. 107a (or 107b, 107c, or 107d), located at a center of wheel-hub 105a (or 105b, 105c, or 105d) and attached to connecting unit 104a (or 104b, 104c, or 104d), and at least one generator, e.g. 106a (or 106b, 106c, or 106d), coupled to wheel-hub 105a (or 105b, 105c, or 105d). In FIG. 1A, generator 106a (or 106b) is represented by a dashed line to show that it may each be disposed inside wheel-hub 105a (or 105b) and may not be seen from the side view.

In some embodiments, brake unit 103a may stop or slow a moving apparatus 100 within a predetermined distance. Apparatus 100 may have a load capacity sufficient to carry all components.

Vertical-axis wind turbine blade 102 may have many configurations in shape and be made of many different materials or combinations of materials. In some embodiments, for example, vertical-axis wind turbine blade 102 may have a helical shape or a sail shape.

There may be many configurations for the connecting unit such as 104a. In one example, the connecting unit may be fixed to body 101 and become a part of body 101. In another example, apparatus 100 may move on an uneven surface, and the connecting unit may also be a suspension unit that reduces movement of apparatus 100 in a vertical direction.

A wheel with the wheel-hub such as 105a (or 105b, 105c, or 105d) may move on a surface, a dual-rail track, a monorail track, a floating track, or a magnetic levitation track. The wheel-hub may be a hub of a wheel with or without a tire.

A generator such as 106a (or 106b, 106c, or 106d) may be coupled to a wheel-hub such as 105a (or 105b, 105c, or 105d) through a central shaft such as 107a (or 107b, 107c, or 107d). In some embodiments, the central shaft may be fixed to a center of the wheel-hub, such that it may have the same rotational speed as the wheel-hub. In some embodiments, a central shaft such as 107a (or 107b, 107c, or 107d) may also be fixed to a rotor of a generator such as 106a (or 106b, 106c, or 106d), such that the rotor may have the same rotational speed as the central shaft and may drive the generator to generate electrical power. The rotor may rotate coaxially with the wheel-hub. In one example shown in FIG. 1B, a generator such as 106a (or 106b, 106c, or 106d) is disposed inside a wheel-hub such as 105a (or 105b, 105c, or 105d) and an outer rotor of the generator may be formed integrally with the wheel-hub. In one embodiment, a central shaft such as 107a (or 107b, 107c, or 107d) of a wheel-hub such as 105a (or 105b, 105c, or 105d) may also be an inner rotor of a generator such as 106a (or 106b, 106c, or 106d).

In one example, when wind exerts forces on vertical-axis wind turbine blade 102, vertical-axis wind turbine blade 102 may translate the wind forces to body 101, causing body 101 to move. The movement of body 101 may drive wheel-hub 105a (or 105b, 105c, or 105d) to rotate. The rotation of wheel-hub 105a (or 105b, 105c, or 105d) may drive corresponding generator 106a (or 106b, 106c, or 106d) to generate electrical power.

An external force other than the wind forces may drive apparatus 100. In one embodiment, an external force other than the wind forces may drive apparatus 100 temporarily from a stationary position into motion.

Apparatus 100 may further comprise a detector unit 108 and a control unit 109 as shown in FIG. 1A. The at least one generator may include a first generator 106a and a second generator 106b as shown in FIGS. 1A and 1B. In some embodiments, detector unit 108 may detect wind speeds and wind directions. Control unit 109 may receive detection results from the detector unit. Based on the detection results, control unit 109 may control the first generator 106a to operate under a first wind speed or direction, and may control the second generator 106b to operate under a second wind or direction.

Control unit 109 may further comprise a non-transitory computer-readable storage medium (memory) and a processor. In some embodiments, the memory may store detection results and instructions that, when executed by the processor, cause control unit 109 to receive detection results from the detector unit and, based on the detection results, to control first generator 106a to operate under a first wind speed or direction, and control second generator 106b to operate under a second wind or direction.

FIG. 2A is a schematic side view of another embodiment of an exemplary wheel-hub driven wind turbine 200, in which a generator is disposed next to a wheel-hub and a central shaft of the wheel-hub is fixed to a rotor of the generator to drive the generator to generate electrical power, consistent with the present disclosure. FIG. 2B is a schematic top view of an embodiment of the exemplary wheel-hub driven wind turbine 200 of FIG. 2A. Some components of apparatus 200 may be shown in only one of FIGS. 2A and 2B to keep the illustrations clean. For example, component 202 is shown in FIG. 2A but not in FIG. 2B. Some similar components may not be shown in FIG. 2A due to the angle of view. For example, from a top view in FIG. 2B, four similar components 206a-206d (or 205a-205d or 207a-207d) are shown, but from a side view in FIG. 2A, only 206a and 206b (or 205a and 205b, or 207a and 207b) can be seen. Apparatus 200 may comprise a number of components, some of which may be optional.

Apparatus 200 may comprise a body 201, at least one vertical-axis wind turbine blade 202 mounted on body 201, at least one brake unit, e.g. 203a (or 103b, 103c, or 103d), at least one connecting unit, e.g. 204a (or 204b, 204c, 204d), attached to body 201, at least one wheel-hub, e.g. 205a (or 205b, 205c, or 205d), with a central shaft, e.g. 207a (or 207b, 207c, or 207d), located at a center of wheel-hub 205a (or 205b, 205c, or 205d) and attached to connecting unit 204a (or 204b, 204c, 204d), and at least one generator, e.g. 206a (or 206b, 206c, or 206d), coupled to wheel-hub 205a (or 205b, 205c, or 205d). In FIG. 2A, generator 206a (or 206b) may be represented by a dashed line because it may be disposed next to an inner side of wheel-hub 205a (or 205b) and may not be seen from an outer side view.

In some embodiments, brake unit 203a (or 203b) may stop or slow a moving apparatus 200 within a predetermined distance. Apparatus 200 may have a load capacity sufficient to carry all components.

Vertical-axis wind turbine blade 202 may have many configurations in shape and be made of many different materials or combinations of materials. In some embodiments, vertical-axis wind turbine blade 202 may have a helical shape or a sail shape.

There may be many configurations for connecting unit such as 204a. In one example, the connecting unit may be fixed to body 201 and become a part of body 201. In another example, apparatus 200 may move on an uneven surface, and the connecting unit may also be a suspension unit that reduces movement of apparatus 200 in a vertical direction.

A wheel with wheel-hub 205a (or 205b, 205c, or 205d) may move on a surface, a dual-rail track, a monorail track, a floating track, or a magnetic levitation track. The wheel-hub may be a hub of a wheel with or without a tire.

A generator such as 206a (or 206b, 206c, or 206d) may be coupled to a wheel-hub such as 205a (or 205b, 205c, or 205d) through a central shaft such as 207a (or 207b, 207c, or 207d). In some embodiments, the central shaft may be fixed to a center of the wheel-hub, such that it may have a same rotational speed as the wheel-hub. In some embodiments, a central shaft such as 207a (or 207b, 207c, or 207d) may also be fixed to a rotor of a generator such as 206a (or 206b, 206c, or 206d), such that the rotor may have the same rotational speed as the central shaft and may drive the generator to generate electrical power. The rotor may rotate coaxially with the wheel-hub. In one example shown in FIG. 2B, a generator such as 206a (or 206b, 206c, or 206d) is disposed next to a wheel-hub such as 205a (or 205b, 205c, or 205d). In some embodiments, a central shaft such as 207a (or 207b, 207c, or 207d) of a wheel-hub such as 205a (or 205b, 205c, or 205d) may also be a rotor of a generator such as 206a (or 206b, 206c, or 206d).

In one example, when wind exerts forces on vertical-axis wind turbine blade 202, vertical-axis wind turbine blade 202 may translate the wind forces to body 201, causing body 201 to move. The movement of body 201 may drive wheel-hub 205a (or 205b, 205c, or 205d) to rotate. The rotation of wheel-hub 205a (or 205b, 205c, or 205d) may drive corresponding generator 206a (or 206b, 206c, or 206d) to generate electrical power.

An external force other than the wind forces may drive apparatus 200. In one embodiment, an external force other than the wind forces may drive apparatus 200 temporarily from a stationary position into motion.

Apparatus 200 may further comprise a detector unit 208 and a control unit 209. The at least one generator may include a first generator 206a and a second generator 206b as shown in FIGS. 2A and 2B. In some embodiments, detector unit 208 may detect wind speeds and wind directions. Control unit 209 may receive detection results from the detector unit. Based on the detection results, control unit 209 may control first generator 206a to operate under a first wind speed or direction, and may control second generator 206b to operate under a second wind or direction.

Control unit 209 may further comprise a non-transitory computer-readable storage medium (memory) and a processor. In some embodiments, the memory may store detection results and instructions that, when executed by the processor, cause control unit 209 to receive detection results from the detector unit and, based on the detection results, to control first generator 206a to operate under a first wind speed or direction, and control second generator 206b to operate under a second wind or direction.

Figure 3A:
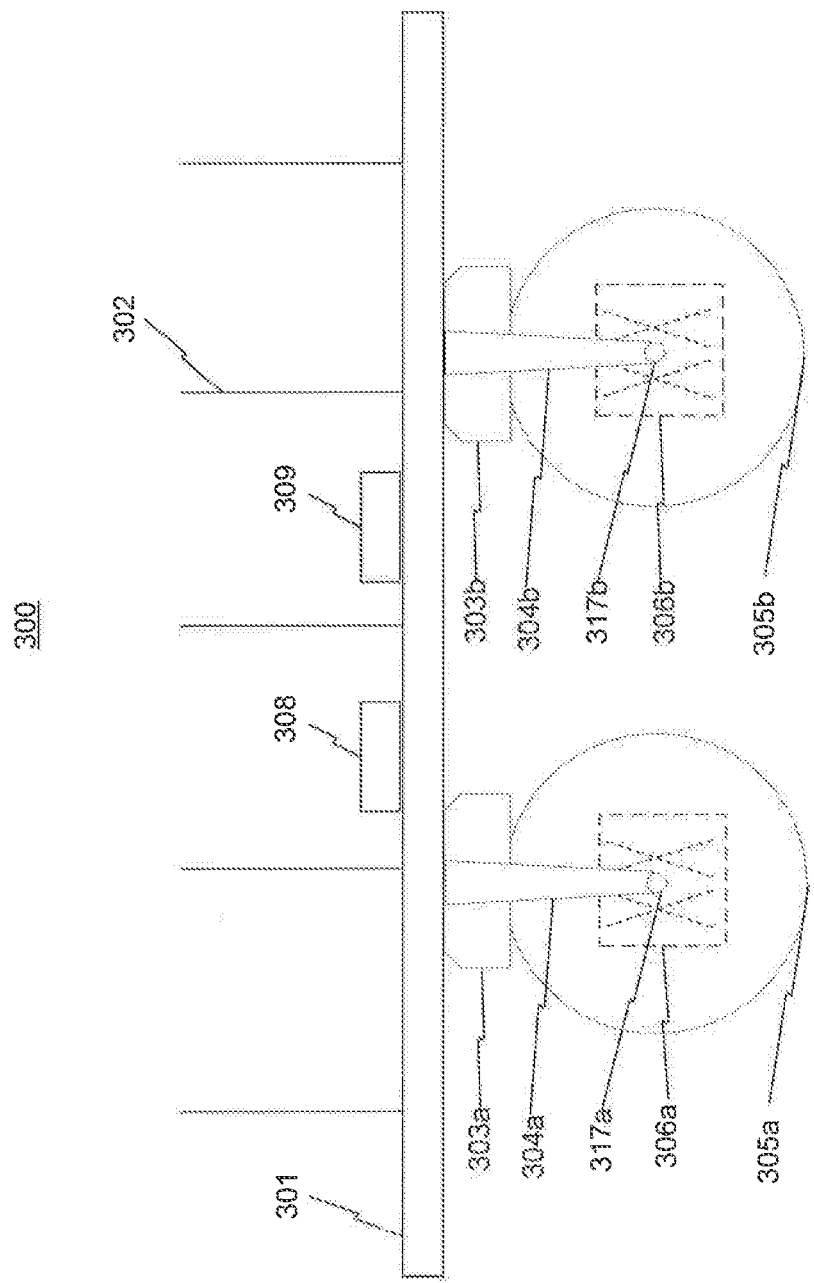
FIG. 3A is a schematic side view of another embodiment of an exemplary wheel-hub driven wind turbine consistent with the present disclosure.

FIG. 3A is a schematic side view of another embodiment of an exemplary wheel-hub driven wind turbine 300, in which a generator is disposed next to a wheel-hub and the rotation of the wheel-hub magnetically drives the generator to generate electrical power, consistent with the present disclosure. FIG. 3B is a schematic top view of an embodiment of the exemplary wheel-hub driven wind turbine 300 of FIG. 3A. Some components of apparatus 300 may be shown in only one of FIGS. 3A and 3B to keep the illustrations clean. For example, component 302 is shown in FIG. 3A but not in FIG. 3B, and components 327a-327d are shown in FIG. 3B but not in FIG. 3A. Some similar components may not be shown in FIG. 3A due to the angle of view. For example, from a top view in FIG. 3B, four similar components 306a-306d (or 305a-305d or 317a-317d) are shown, but from a side view in FIG. 3A, only 306a and 306b (or 305a and 305b, or 317a and 317b) can be seen. Apparatus 300 may comprise a number of components, some of which may be optional.

Apparatus 300 may comprise a body 301, at least one vertical-axis wind turbine blade 302 mounted on body 301, at least one brake unit, e.g. 303a (or 303b, 303c, or 303d), at least one connecting unit, e.g. 304a (or 304b, 304c, or 304d), attached to body 301, at least one wheel-hub, e.g. 305a (or 305b, 305c, or 305d), with a central shaft, e.g. 317a (or 317b, 317c, or 317d), located at the center of wheel-hub 305a (or 305b, 305c, or 305d) and attached to connecting unit 304a (or 304b, 304c, or 304d), and at least one generator, e.g. 306a (or 306b, 306c, or 306d), coupled to wheel-hub 305a (or 305b, 305c, or 305d). In FIG. 3A, generator 306a (or 306b) may be represented by a dashed line because it may be disposed next to an inner side of wheel-hub 305a (or 305b) and may not be seen from an outer side view.

In some embodiments, brake unit 303a (or 303b) may stop or slow a moving apparatus 300 within a predetermined distance. Apparatus 300 may have a load capacity sufficient to carry all components.

Vertical-axis wind turbine blade 302 may have many configurations in shape and be made of many different materials or combinations of materials. In some embodiments, vertical-axis wind turbine blade 302 may have a helical shape or a sail shape.

There may be many configurations for the connecting unit such as 304a. In one example, the connecting unit may be fixed to body 301 and become a part of body 301. In another example, apparatus 300 may move on an uneven surface, and the connecting unit may also be a suspension unit that reduces movement of apparatus 300 in a vertical direction.

A wheel with the wheel-hub such as 305a (or 305b, 305c, or 305d) may move on a surface, a conventional dual-rail track, a floating track, a monorail track, or a magnetic levitation track. The wheel-hub may be a hub of a wheel with or without a tire.

A generator such as 306a (or 306b, 306c, or 306d) may magnetically couple to a wheel-hub such as 305a (or 305b, 305c, or 305d). In some embodiments, a central shaft such as 317a (or 317b, 317c, or 317d) may be separated from a rotor such as 327a (or 327b, 327c, or 327d) of a generator such as 306a (or 306b, 306c, or 306d). The rotation of the wheel-hub may magnetically drive the generator to generate electrical power.

In one example, when wind exerts forces on vertical-axis wind turbine blade 302, the vertical-axis wind turbine blade 302 may translate the wind forces the body 301, causing body 301 to move. The movement of body 301 may drive the wheel-hub 305a (or 305b, 305c, or 305d) to rotate. The rotation of wheel-hub 305a (or 305b, 305c, or 305d) may drive corresponding generator 306a (or 306b, 306c, or 306d) to generate electrical power.

An external force other than the wind forces may drive apparatus 300. In one embodiment, an external force other than the wind forces may drive apparatus 300 temporarily from a stationary position into motion.

Apparatus 300 may further comprise a detector unit 308 and a control unit 309. The at least one generator may include a first generator 306a and a second generator 306b as shown in FIGS. 3A and 3B. In some embodiments, detector unit 308 may detect wind speeds and wind directions. Control unit 309 may receive detection results from the detector unit. Based on the detection results, control unit 309 may control first generator 306a to operate under a first wind speed or direction, and may control second generator 306b to operate under a second wind or direction.

Control unit 309 may further comprise a non-transitory computer-readable storage medium (memory) and a processor. In some embodiments, the memory may store detection results and instructions that, when executed by the processor, cause control unit 309 to receive detection results from the detector unit and, based on the detection results, to control first generator 306a to operate under a first wind speed or direction, and control second generator 306b to operate under a second wind or direction.

Figure 4A:
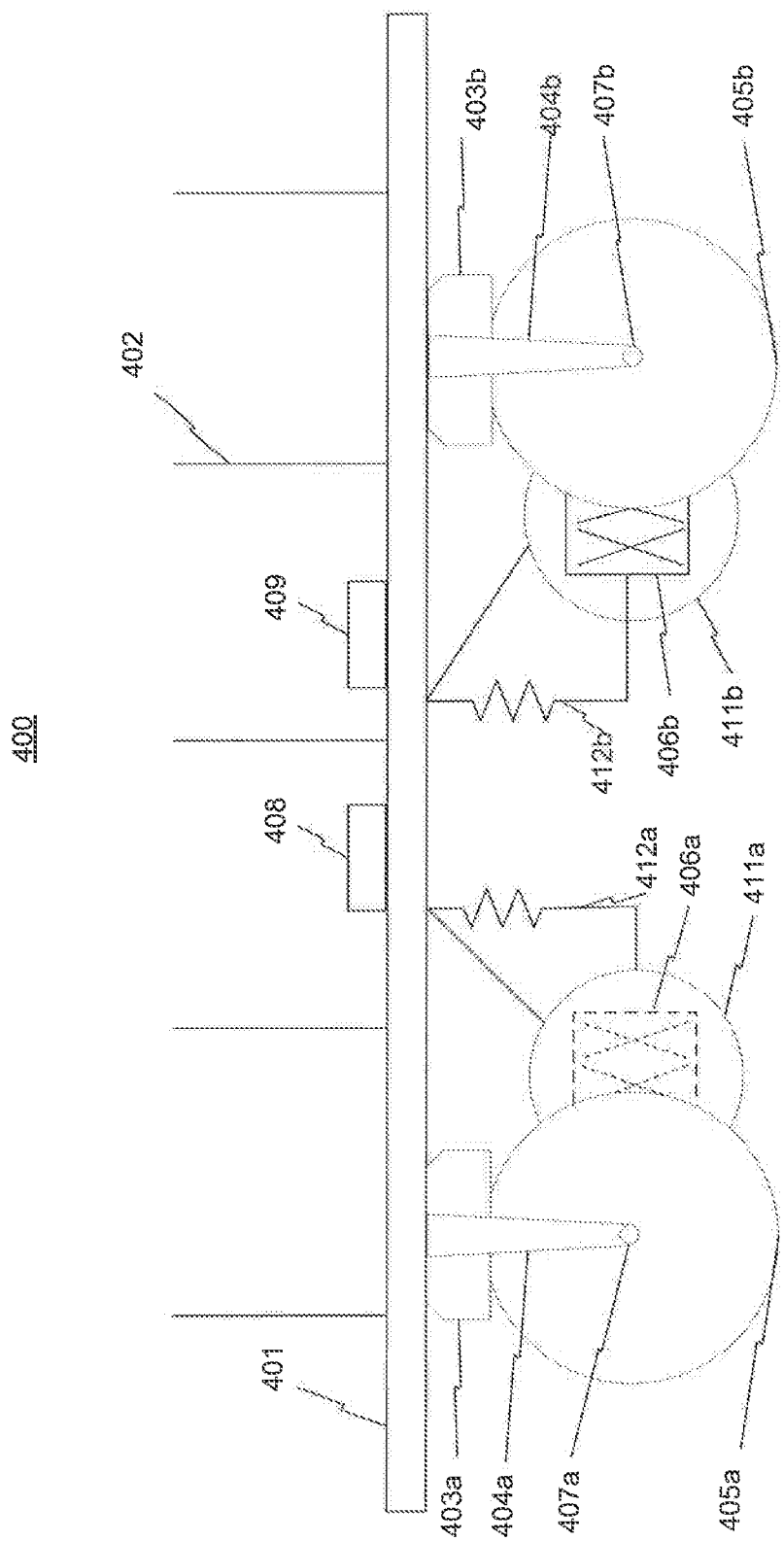
FIG. 4A is a schematic side view of yet another embodiment of an exemplary wheel-hub driven wind turbine consistent with the present disclosure.
Figure 4B:
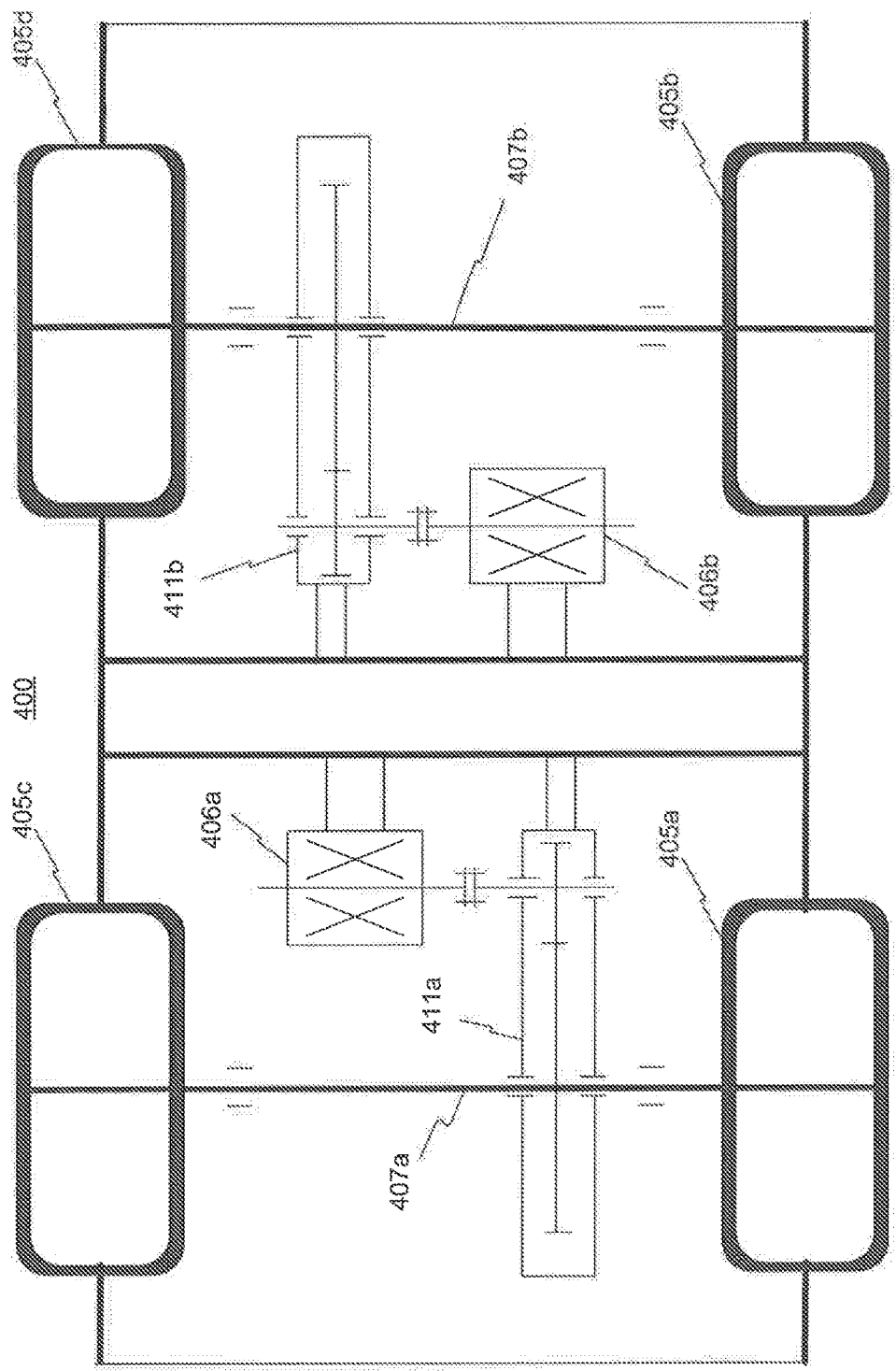
FIG. 4B is a schematic top view of an embodiment of the exemplary wheel-hub driven wind turbine of FIG. 4A.

FIG. 4A is a schematic side view of yet another embodiment of an exemplary wheel-hub driven wind turbine 400, in which a central shaft of a wheel-hub is coupled to a low-speed input shaft of a transmission device and a high-speed output shaft of the transmission device is coupled to a rotation shaft of a generator, consistent with the present disclosure. FIG. 4B is a schematic top view of an embodiment of the exemplary wheel-hub driven wind turbine 400 of FIG. 4A. Some components of apparatus 400 may be shown in only one of FIGS. 4A and 4B to keep the illustrations clean. For example, components 402, 403a-403b, and 404a-404b are shown in FIG. 4A but not in FIG. 4B. Some similar components may not be shown in FIG. 4A due to the angle of view. For example, from a top view in FIG. 4B, four similar components 405a-405d are shown, but from a side view in FIG. 4A, only 405a and 405b can be seen. Apparatus 400 may comprise a number of components, some of which may be optional.

Apparatus 400 may comprise a body 401, at least one vertical-axis wind turbine blade 402 mounted on body 401 at least one brake unit, e.g. 403a (or 403b), at least one connecting unit, e.g. 404a (or 404b), attached to body 401, at least one wheel-hub, e.g. 405a (or 405b, 405c, or 405d), with a central shaft, e.g. 407a (or 407b), located at a center of wheel-hub 405a/405c (or 405b/405d) and attached to connecting unit 404a (or 404b), at least one generator, e.g. 406a (or 406b), coupled to wheel-hub 405a (or 405b), at least one main suspension unit, e.g. 412a (or 412b), and at least one transmission device (such as a gear box, a transmission chain, or a transmission belt), e.g. 411a (or 411b).

In FIG. 4A, a dashed line may indicate that an object is disposed behind another object and may not be seen from the side view.

In some embodiments, brake unit 403a (or 403b) may stop or slow a moving apparatus 400 within a predetermined distance. Main suspension unit 412a (or 412b) may suspend transmission device 411a (or 412b) and/or generator 406a (or 406b) from body 401. Apparatus 400 may have a load capacity sufficient to carry all components.

Vertical-axis wind turbine blade 402 may have many configurations in shape and be made of many different materials or combinations of materials. In some embodiments, vertical-axis wind turbine blade 402 may have a helical shape or a sail shape.

There may be many configurations for connecting unit 404a (or 404b). In one example, the connecting unit may be fixed to body 401 and become a part of body 401. In another example, apparatus 400 may move on an uneven surface, and the connecting unit may also be a suspension unit that reduces movement of apparatus 400 in a vertical direction.

A wheel with wheel-hub 405a (or 405b, 405c, or 405d) may move on a surface, a dual-rail track, a monorail track, a floating track, or a magnetic levitation track. The wheel-hub may be a hub of a wheel with or without a tire.

A generator such as 406a (or 406b, 406c, or 406d) may be coupled to a wheel-hub such as 405a (or 405b, 405c, or 405d) through transmission device 411a (or 411b). The transmission device may comprise at least one gear, chain, or belt. In one example, the transmission device may be a gear train.

In some embodiments, central shaft 407a (or 407b) and generator 406a (or 406b) may both be coupled to a same transmission device 411a (or 411b), such that rotations of wheel-hub 405a/405c (or 405b/405d) may drive generator 406a (or 406b) through transmission device 411a (or 411b). From a side view of some embodiments, generator 406a may be located on an inner side of transmission device 411a, and generator 406b may be located on an outer side of transmission device 411b. In some embodiments, a central shaft such as 407a (or 407b) of a wheel-hub such as 405a (or 405b) is coupled to a low-speed input shaft of a transmission device such as 411a (or 411b) and a high-speed output shaft of the transmission device is coupled to a rotation shaft of a generator such as 406a (or 406b).

In one example, when wind exerts forces on vertical-axis wind turbine blade 402, vertical-axis wind turbine blade 402 may translate the wind forces to body 401, causing body 401 to move. The movement of body 401 may drive a wheel-hub such as 405a (or 405b, 405c, or 405d) to rotate. The rotation of wheel-hub 405a (or 405b, 405c, or 405d) may drive corresponding generator 406a (or 406b) to generate electrical power.

An external force other than the wind forces may drive apparatus 400. In one embodiment, this external force may drive apparatus 400 temporarily from a stationary position into motion.

Apparatus 400 may further comprise a detector unit 408 and a control unit 409. The at least one generator may include a first generator 406a and a second generator 406b as shown in FIGS. 4A and 4B. In some embodiments, detector unit 408 may detect wind speeds and wind directions. Control unit 409 may receive detection results from the detector unit. Based on the detection results, control unit 409 may control first generator 406a to operate under a first wind speed or direction, and may control second generator 406b to operate under a second wind or direction.

Control unit 409 may further comprise a non-transitory computer-readable storage medium (memory) and a processor. In some embodiments, the memory may store detection results and instructions that, when executed by the processor, cause control unit 409 to receive detection results from the detector unit and, based on the detection results, to control first generator 406a to operate under a first wind speed or direction, and control second generator 406b to operate under a second wind or direction.

Figure 5A:
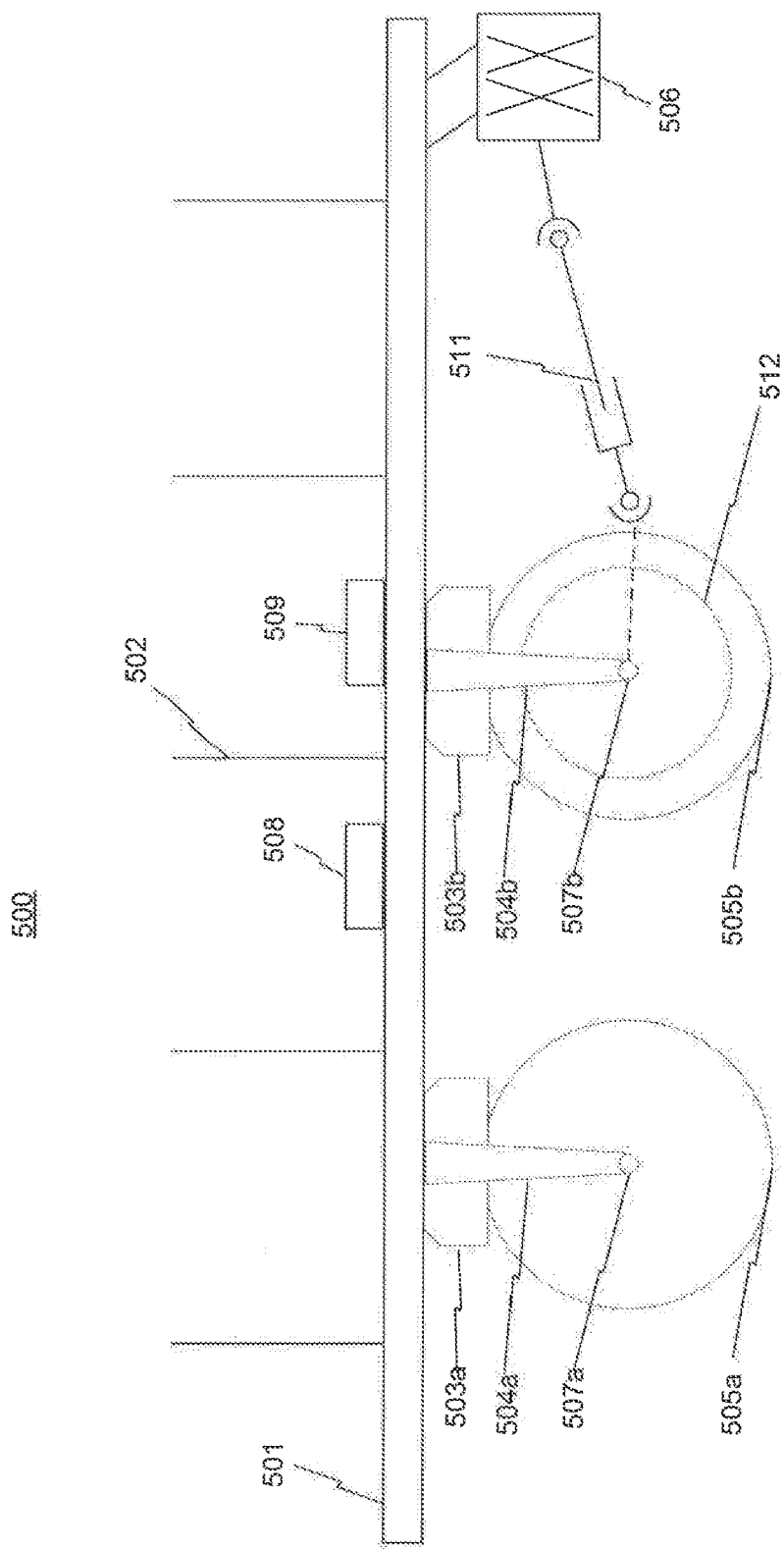
FIG. 5A is a schematic side view of another embodiment of an exemplary wheel-hub driven wind turbine consistent with the present disclosure.
Figure 5B:
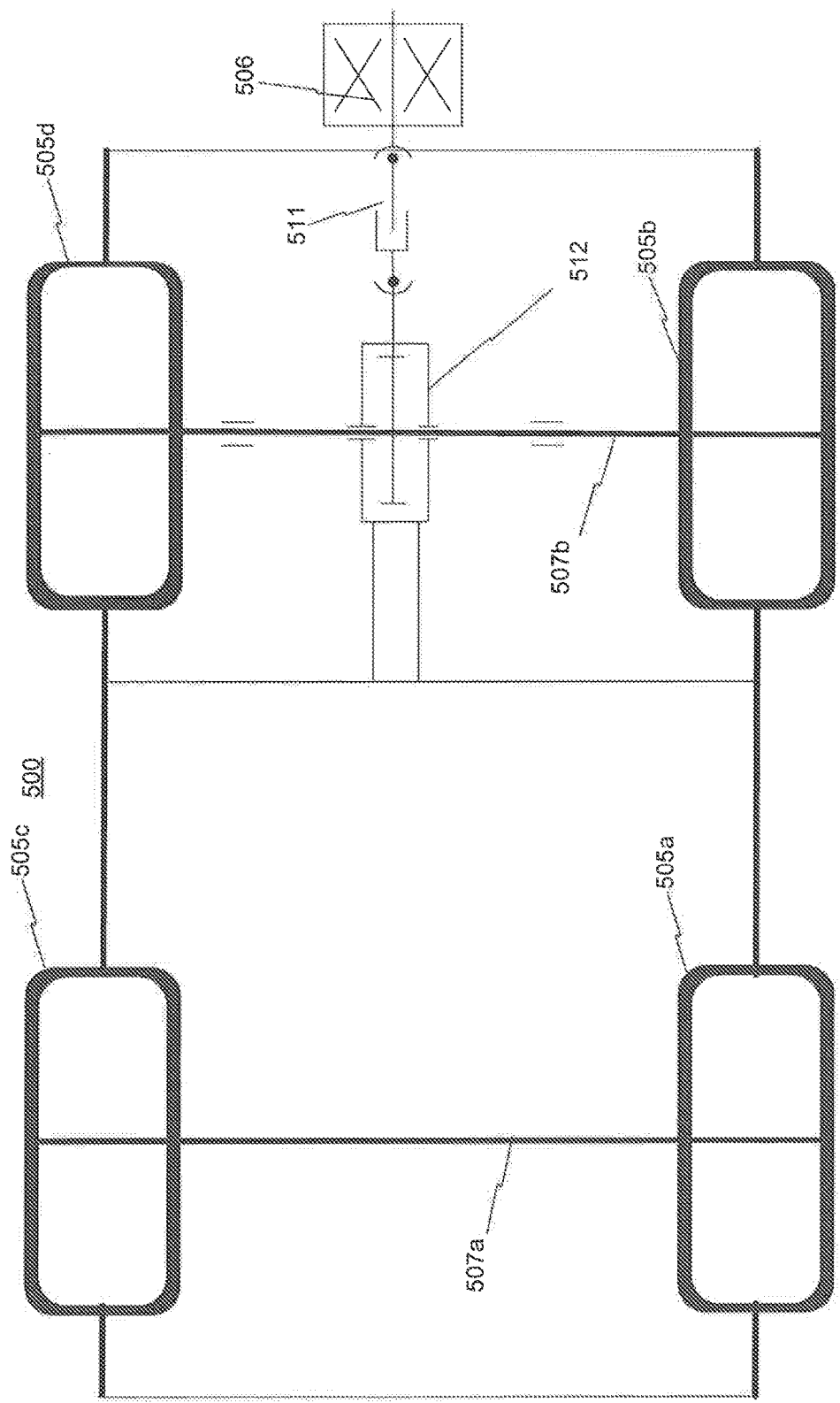
FIG. 5B is a schematic top view of an embodiment of the exemplary wheel-hub driven wind turbine of FIG. 5A.

FIG. 5A is a schematic side view of another embodiment of an exemplary wheel-hub driven wind turbine 500, in which a central shaft of a wheel-hub is coupled to a low-speed input shaft of a transmission device and a high-speed output shaft of the transmission device is coupled to a rotation shaft of a generator via a cardan shaft, consistent with the present disclosure. FIG. 5B is a schematic top view of an embodiment of exemplary wheel-hub driven wind turbine 500 of FIG. 5A. Some components of apparatus 500 may be shown in only one of FIGS. 5A and 5B to keep the illustrations clean. For example, component 502 is shown in FIG. 5A but not in FIG. 5B. Some similar components may not be shown in FIG. 5A due to the angle of view. For example, from a top view in FIG. 5B, four similar components 505a-505d are shown, but from a side view in FIG. 5A, only 505a and 505b can be seen. Apparatus 500 may comprise a number of components, some of which may be optional.

Apparatus 500 may comprise a body 501, at least one vertical-axis wind turbine blade 502 mounted on the body 501, at least one brake unit, e.g. 503a (or 503b), at least one connecting unit, e.g. 504a (or 504b), attached to body 501, at least one wheel-hub, e.g. 505a (or 505b, 505c, or 505d), with a central shaft, e.g. 507a (or 507b), located at the center of wheel-hub 505a (or 505b) and attached to connecting unit 504a (or 504b), at least one generator 506 coupled to wheel-hub 505b, a transmission device (such as a gear box, a transmission chain, or a transmission belt) 512, a cardan shaft 511, a detector unit 508, and a control unit 509. In FIG. 5A, a dashed line may indicate that an object is disposed behind another object and may not be seen from the side view.

In some embodiments, a brake unit such as 503b may stop or slow a moving apparatus 500 within a predetermined distance. Generator 506 may be attached body 501. Apparatus 500 may have a load capacity sufficient to carry all components.

Vertical-axis wind turbine blade 502 may have many configurations in shape and material. In some embodiments, vertical-axis wind turbine blade 502 may have a helical shape or a sail shape.

There may be many configurations for the connecting unit such as 504a (or 504b). In one example, the connecting unit may be fixed to body 501 and become a part of body 501. In another example, apparatus 500 may move on an uneven surface, and the connecting unit may be a suspension unit that reduces movement of apparatus 500 in a vertical direction.

A wheel with a wheel-hub such as 505b may move on a surface, a dual-rail track, a monorail track, a floating track, or a magnetic levitation track. The wheel-hub such as 505b may be a hub of a wheel with or without a tire.

In some embodiments, a central shaft such as 507b of a wheel-hub such as 505b is coupled to a low-speed input shaft of transmission device 512 and a high-speed output shaft of the transmission device is coupled to a rotation shaft of generator 506 via a cardan shaft 511. Generator 506 may be coupled to wheel-hub 505b through cardan shaft 511 and transmission device 512. The transmission device may comprise at least one gear, chain, or belt. In one example, the transmission device may be a gear train. Shaft 511 may be a coupling shaft or a drive shaft. In some embodiments, the central shaft 507b may be coupled to transmission device 512, the transmission device may be coupled to shaft 511, and shaft 511 may be coupled to generator 506. In this way, rotations of wheel-hub 505b may drive generator 506 through transmission device 512 and shaft 511.

In one example, when wind exerts forces on vertical-axis wind turbine blade 502, vertical-axis wind turbine blade 502 may translate the wind forces to body 501, causing body 501 to move. The movement of body 501 may drive wheel-hub 505b to rotate. The rotation of wheel-hub 505b may drive generator 506 to generate electrical power.

An external force other than the wind forces may drive apparatus 500. In one embodiment, this external force may drive apparatus 500 temporarily from a stationary position into motion.

Figure 6:
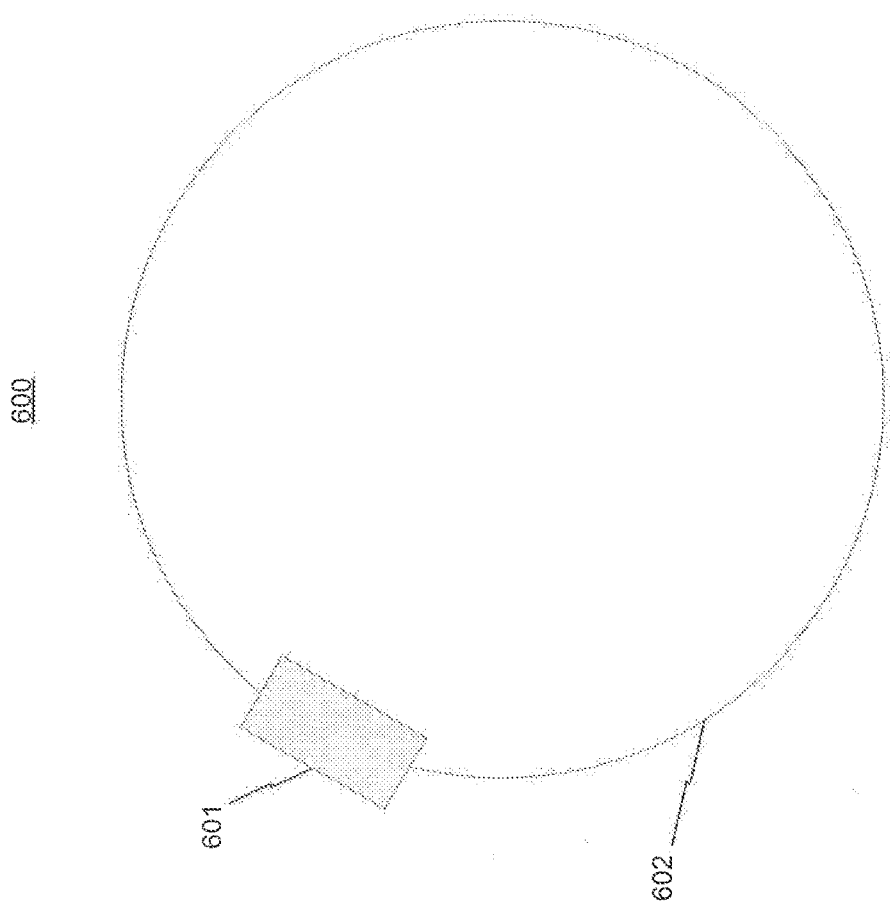
FIG. 6 is a schematic top view of an embodiment of an exemplary wheel-hub driven wind turbine consistent with the present disclosure.

FIG. 6 is a schematic top view of an embodiment of an exemplary wheel-hub driven wind turbine 601 moving along a track 602 according to an embodiment of the present disclosure. Apparatus 601 may be or include apparatus 100, apparatus 200, apparatus 300, apparatus 400, and/or apparatus 500. Track 602 may be optional. Track 602 may be circular or elliptical shape.

In one example, track 602 may be a monorail track. In another example, track 602 may be a magnetic levitation monorail track. In yet another example, track 602 may be a virtual guiding track for apparatus 601 to follow on a surface. In another example, track 602 may be a track floating on a liquid surface.

FIG. 7 is a schematic top view of another embodiment of an exemplary wheel-hub driven wind turbine 701 moving along a track 702 according to an embodiment of the present disclosure. Apparatus 701 may be or include apparatus 100, apparatus 200, apparatus 300, apparatus 400, and/or apparatus 500. Track 702 may be optional. Track 702 may be circular or elliptical shape.

In one example, track 702 may be a dual-rail track. In another example, track 702 may be a magnetic levitation dual-rail track. In yet another example, track 702 may be a virtual guiding track for apparatus 701 to follow on a surface. In another example, track 702 may be a dual-rail track floating on a liquid surface.

The specification has described a system of wheel-hub driven wind turbines. The illustrated steps are set out to explain the exemplary embodiments shown, and it should be anticipated that ongoing technological development will change the manner in which particular functions are performed. Thus, these examples are presented herein for purposes of illustration, and not limitation. For example, steps or processes disclosed herein are not limited to being performed in the order described, but may be performed in any order, and some steps may be omitted, consistent with disclosed embodiments. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

Furthermore, one or more non-transitory computer-readable storage media may be utilized in implementing embodiments consistent with the present disclosure. A non-transitory computer-readable storage medium refers to any type of physical memory on which information or data readable by a processor may be stored. Thus, a non-transitory computer-readable storage medium may store instructions for execution by one or more processors, including instructions for causing the processor(s) to perform steps or stages consistent with the embodiments described herein. The term "non-transitory computer-readable medium" should be understood to include tangible items and exclude carrier waves and transient signals that are non-transitory. Examples of non-transitory computer-readable media include RAM, ROM, volatile memory, nonvolatile memory, hard drives, CD ROMs, DVDs, flash drives, disks, and any other known physical storage media.

It will be appreciated that the present inventions are not limited to the exact construction that has been described above and illustrated in the accompanying drawings, and that various modifications and changes can be made without departing from the scope thereof. It is intended that the scope of the inventions should only be limited by the appended claims.

What is claimed is:

1. A wheel-hub driven wind turbine apparatus, comprising:
    a body;
    at least one vertical-axis wind turbine blade mounted on the body and configured to translate wind forces exerting on the at least one vertical-axis wind turbine blade to the body, causing the body to move;
    at least one wheel-hub attached to the body and configured to rotate when driven by the movement of the body;
    at least one generator disposed next to the at least one wheel-hub and configured to generate electrical power when driven by the rotation of the at least one wheel-hub, the at least one generator comprising a rotor, a first generator, and a second generator,
    wherein
        the at least one wheel-hub is separated from the rotor while being magnetically coupled to the rotor, and
        the at least one wheel-hub is configured to magnetically drive the rotor;
    a detector unit on the body configured to detect wind speeds; and
    a control unit on the body coupled to the detector unit, the first generator, and the second generator, the control unit being configured to:
        operate the first generator when the detector detects a first wind speed, and
        operate the second generator when the detector detects a second wind speed.

2. The apparatus of claim 1, wherein
    the at least one wheel-hub comprises a central shaft; and
    the rotor aligned with the central shaft.

3. The apparatus of claim 2, wherein the rotor rotates coaxially with the at least one wheel-hub.

4. The apparatus of claim 3, wherein the at least one generator is disposed on an inner side of the body with respect to the at least one wheel-hub.

5. The apparatus of claim 1, wherein the at least one wheel-hub magnetically drives the at least one generator to generate electrical power.

6. The apparatus of claim 1, wherein the at least one generator is suspended from the body.

7. The apparatus of claim 1, wherein the at least one wheel-hub moves along a circular or elliptical track.

8. The apparatus of claim 7, wherein the track is a monorail track.

9. The apparatus of claim 7, wherein the track is a dual-rail track.

10. The apparatus of claim 1, wherein the at least one wheel-hub is a hub of a wheel with a tire.

11. The apparatus of claim 1, wherein
    the at least one generator comprises a first generator and a second generator; and
    the apparatus further comprises:
        a detector unit configured to detect wind directions; and
        a control unit coupled to the detector unit, the first generator, and the second generator, the controller being configured to:
            operate the first generator when the detector detects a first wind direction, and
            operate the second generator when the detector detects a second wind direction.

12. A wheel-hub driven wind turbine apparatus, comprising:
    a body;
    at least one vertical-axis wind turbine blade mounted on the body and configured to translate wind forces exerting on the at least one vertical-axis wind turbine blade to the body, causing the body to move;
    a first wheel-hub attached to a first side of the body, the first wheel-hub being mounted on a first rail;
    a second wheel-hub attached to a second side of the body, the second wheel-hub being mounted on a second rail parallel to the first rail, the second side being opposite to the first side;
    a central shaft coupled to the first wheel-hub and the second wheel-hub;
    a transmission coupled to the central shaft; and
    at least one generator coupled to the transmission comprising a cardan shaft, the at least one generator including a first generator and a second generator,
    wherein
    the first wheel-hub and the second wheel-hub are configured to rotate when driven by the movement of the body;
    a detector unit on the body configured to detect wind speeds; and
    a control unit on the body coupled to the detector unit, the first generator, and the second generator, the control unit being configured to:
        operate the first generator when the detector detects a first wind speed, and
        operate the second generator when the detector detects a second wind speed.

13. The apparatus of claim 12, wherein the generator comprises a rotor indirectly coupled to the first wheel-hub and the second wheel-hub through the transmission.

14. The apparatus of claim 13, wherein
the central shaft is coupled to the transmission with a low-speed input shaft; and
the transmission is coupled to the rotor with a high-speed output shaft.

15. The apparatus of claim 14, wherein the high-speed output shaft is coupled to the rotor via the cardan shaft.

16. A wheel-hub driven wind turbine apparatus, comprising:
a body;
a plurality of vertical-axis wind turbine blades mounted on the body and configured to translate wind forces exerting on the plurality of vertical-axis wind turbine blades to the body, causing the body to move;
at least four wheel-hubs attached to the body;
at least four generators, each generator being coupled with at least one of the at least four wheel-hubs;
wherein
the at least four wheel-hubs are configured to rotate when driven by the movement of the body, and
the at least four generators comprise a first generator and a second generator;
a detector unit on the body configured to detect wind speeds; and
a control unit on the body coupled to the detector unit, the first generator, and the second generator, the control unit being configured to:
operate the first generator when the detector detects a first wind speed, and
operate the second generator when the detector detects a second wind speed.

17. The apparatus of claim 16, wherein each one of the at least four generators is disposed inside one of the at least four wheel-hubs.

18. The apparatus of claim 17, wherein each one of the at least four generators comprises a rotor, each rotor being formed integrally with the at least one of the at least four wheel-hubs.

19. The apparatus of claim 16, wherein each one of the at least four wheel-hubs comprises a central shaft, each central shaft being fixed to a corresponding rotor of one of the at least four generators.

* * * * *